(12) United States Patent
Hauske et al.

(10) Patent No.: US 8,288,707 B2
(45) Date of Patent: Oct. 16, 2012

(54) OPTOELECTRONIC SENSOR

(75) Inventors: Maximilian Hauske, Mannheim (DE); Ralph Tanbourgi, Heidelberg (DE); Kai Waslowski, Emmendingen (DE); Gerhard Merettig, Sexau (DE)

(73) Assignee: Sick AG, Waldkirch (DE)

( * ) Notice: Subject to any disclaimer, the term of this patent is extended or adjusted under 35 U.S.C. 154(b) by 430 days.

(21) Appl. No.: 12/659,288

(22) Filed: Mar. 3, 2010

(65) Prior Publication Data

US 2010/0224762 A1 Sep. 9, 2010

(30) Foreign Application Priority Data

Mar. 4, 2009 (EP) .................................... 09003109

(51) Int. Cl.
*G06M 7/00* (2006.01)
*H04B 10/00* (2006.01)

(52) U.S. Cl. ...................................... 250/221; 398/130

(58) Field of Classification Search .............. 250/214 C, 250/214 R, 214.1, 221, 222.1; 398/118–131; 356/221–226; 340/555–557
See application file for complete search history.

(56) References Cited

U.S. PATENT DOCUMENTS

| 5,008,898 | A | | 4/1991 | Hamatsu et al. |
| 5,760,941 | A | | 6/1998 | Young et al. |
| 5,818,617 | A | * | 10/1998 | Shipley ........................... 398/54 |
| 6,211,807 | B1 | | 4/2001 | Wilkison |
| 6,838,655 | B2 | | 1/2005 | Heimlicher |
| 6,982,945 | B1 | * | 1/2006 | Gossett ........................ 370/208 |
| 6,990,138 | B2 | * | 1/2006 | Bejjani et al. ................ 375/146 |
| 7,003,021 | B2 | * | 2/2006 | Gilhousen et al. ............ 375/150 |
| 7,405,812 | B1 | * | 7/2008 | Bamji ............................. 356/5.1 |
| 2003/0053519 | A1 | | 3/2003 | Gilhousen et al. |
| 2006/0017545 | A1 | | 1/2006 | Volpi et al. |
| 2006/0140251 | A1 | | 6/2006 | Brown et al. |
| 2009/0016735 | A1 | | 1/2009 | Schmitz et al. |

FOREIGN PATENT DOCUMENTS

DE 31 19 876 A1 12/1982

(Continued)

OTHER PUBLICATIONS

Ipatov, Valery P., "Spread Spectrum and CDMA: Principles and Applications," (2005), Chapter 3, Merits of Spread Spectrum, pp. 77-82, John Wiley and Sons, Ltd.

(Continued)

*Primary Examiner* — Seung C Sohn
(74) *Attorney, Agent, or Firm* — The Nath Law Group; Jerald L. Meyer; Stanley N. Protigal

(57) ABSTRACT

An optoelectronic sensor includes at least one light transmitter for the transmission of light signals into a monitored zone and at least one light receiver for the reception of transmitted light signals. In this respect, the received light signals are converted into electrical received signals in the light receiver. The light signals transmitted by the light transmitter are each generated on the basis of an output signal spread in accordance with a frequency spreading technique (spread spectrum) and provided with an offset applied for the generation of a unipolar signal. The electrical received signals can be supplied to a high-pass filter in the light receiver. Means for interference suppression are provided to automatically measure repeatedly or continuously respective then current interference; to analyze it in the time domain and/or in the frequency domain; and to compensate it at least substantially in dependence on the respective result of the interference analyses.

15 Claims, 3 Drawing Sheets

FOREIGN PATENT DOCUMENTS

Figure 1:
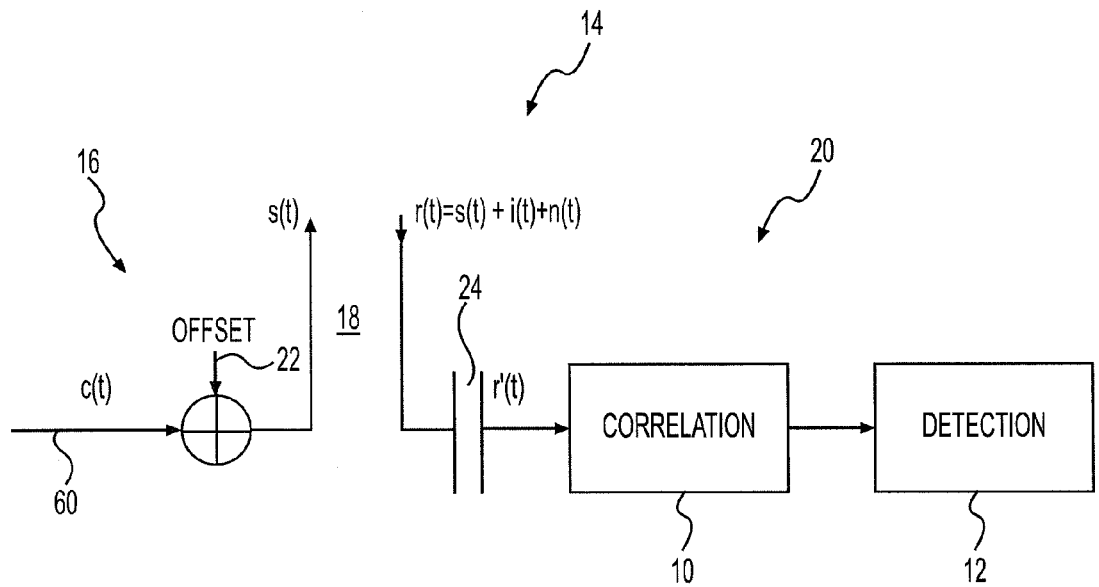

| | | | |
|---|---|---|---|
| DE | 40 10 274 A1 | 10/1990 |
| DE | 40 35 710 A1 | 5/1992 |
| DE | 195 10 304 C1 | 2/1996 |
| DE | 199 26 214 A1 | 1/2001 |
| DE | 100 46 136 A1 | 4/2002 |
| DE | 10 2004 003 814 A1 | 8/2005 |
| DE | 10 2008 009 180 A1 | 1/2009 |
| DE | 10 2008 015 286 A1 | 10/2009 |
| EP | 1 044 526 B1 | 10/2000 |
| EP | 1 202 483 A1 | 5/2002 |
| EP | 1 318 606 A1 | 6/2003 |
| EP | 2 015 110 A1 | 1/2009 |
| EP | 2 103 962 A1 | 9/2009 |
| WO | 99/41871 A1 | 8/1999 |
| WO | 02/060081 A2 | 8/2002 |
| WO | 02/093950 A2 | 11/2002 |

OTHER PUBLICATIONS

Simon, Marvin K., et al. "Spread Spectrum Communications Handbook," (1994), Chapter 1, Coherent Direct-Sequence Systems, pp. 403-406, McGraw-Hill.

Sarwate, D.V., et al. "Crosscorrelation properties of pseudorandom and related sequences". 1980. Proceedings of the IEEE. vol. 68, No. 5, pp. 593-619. XP000857081.

Kavehrad, M., et al. "Optical code-division-multiplexed systems based on spectral encoding of noncoherent sources". 1995. Journal of Lightwave Technology. vol. 13, No. 3, pp. 534-545. New York, NY, US.

Proakis, J.G. "Interference suppression in spread spectrum systems". 1996. Proc. IEEE 4th International Symposium on Spread Spectrum Technics and Applications. pp. 259-266.

O'Farrell, T., et al. "Performance of a spread spectrum infrared transmission system under ambient light interference". 1998. pp. 703-707.

Meel, J. "Spread spectrum (SS)". 1999. De Nayer Instituut, Hogeschool voor Wetenschap & Kunst. pp. 1-33.

Chen, X. et al. "Frequency domain interference supression in a DSSS system", 2002. Communications, Circuits and Systems and West Sino Expositions. IEEE. pp. 247-251.

Haykin, S. "Cognitive radar: a way of the future". IEEE Signal Processing Magazine. 2006, vol. 23, pp. 1-11.

Chuandan, W., et al. "Interference avoidance using fractional fourier transform in transform domain communication system". 2007. The 9th International Conference on Advanced Communication Technology. pp. 1756-1760.

European Search Report dated Oct. 1, 2009, with English Translation.

* cited by examiner

OPTOELECTRONIC SENSOR

The invention relates to an optoelectronic sensor having at least one light transmitter for the transmission of light signals into a monitored zone and at least one light receiver for the reception of light signals, wherein the received light signals are converted into electrical received signals. It furthermore relates to a method for interference suppression in accordance with the preamble of claim 15.

Such sensors can be used, for example, as multi-ray light grid systems for access monitoring, where in particular dangerous machine working zones or specific spaces within a building should be secured.

When an object moves into the monitored zone with sensors of the named kind and the light path between the light transmitter and the light receiver is thereby interrupted, in particular an object detection signal can be generated via a correspondingly designed control and/or evaluation device, said signal resulting, for example, in the switching off of a machine and/or in the triggering of an acoustic or optical warning signal.

Optoelectronic sensors are used to a great extent in wireless optical applications such as, for example, for target acquisition and short range communication. On a use in an environment exposed to high interference, these optoelectronic sensors can be so greatly impaired in their operation that a false detection occurs.

With the current light barriers, light sensors and the like, a sequence of pulsed signals is used as a transfer wave form, with such a wave form being radiated as optical power and subsequently being received by a photo-detector on the side of the light receiver.

In the field of radar and communications engineering, a so-called DSSS (direct sequence spread spectrum) frequency spreading technique is successfully used to improve the reliability and robustness of the signals with respect to interference. Such frequency spreading techniques are described in more detail in "Spread Spectrum Communications Handbook", Marvin K. Simon et al., McGraw-Hill, 1994, and "Spread Spectrum and CDMA: Principles and Applications", Valerie P. Ipatov, John Wiley and Sons, 2005.

With cognitive radar systems, environmental information is additionally also used to achieve a matching to the current detection task and to the interference environment. Such cognitive radar systems are described in more detail, for example, in "Cognitive radar: a way of the future", Haykin, S., Signal Processing Magazine, IEEE, Volume: 23, Issue: 1 Jan. 2006.

Different processes are, for example, described in more detail for interference suppression in DSSS communication systems, such as "clipping" for the improvement of the quality of pulsed interference and processes for interference suppression based on frequency domain analysis, in the following publications: "Interference suppression in spread spectrum systems", Proakis, J. G. Proc. IEEE 4th International Symposium on Spread Spectrum Technics and Applications, 1996, "Interference Avoidance Using Fractional Fourier Transform in Transform Domain Communication System", Wang Chuandan and Zang Zhongpei and Li Shaoqian, Advanced Communication Technology, The 9th International Conference on 2007, and "Frequency domain interference suppression in a DSSS System", Xiaowen Chen, Wei Guo, Yong Zheng, Communications, Circuits and Systems and West Sino Expositions, IEEE 2002, International Conference on, 2002.

Pure pulse-based signalizing systems with interference synchronization in which pulses are synchronized with the interference signal are only effective where a small number of interference signals occurs. Interference originating from other sources such as environmental light and fluorescent lamps nevertheless impairs the transmission quality, in particular when the pulses are transmitted periodically.

The DSSS frequency spreading technique admittedly brings along a greater robustness with narrow-band interference by the use of pseudo-noise sequences which have a white spectrum, said robustness also being reflected in a small correlation coefficient for a large number of interference signals. Nevertheless, the transmission quality decreases on an increase of the interference power with a static system design with fixed spread sequences and a lack of adaptivity.

Intensity modulation (IM) is frequently used together with direct detection (DD) as modulation schemes for optoelectronic sensors. In this respect, the transmitted wave form is modulated onto an instantaneous optical power which is radiated by a light-emitting diode (LED) or laser diode. On the receiver side, the optical power is received by a photodiode and is converted directly into an equivalent electric current. Such a wireless optoelectronic IM/DD connection can normally only work in an incoherent manner since the signal transmitted is always not negative.

It is the underlying object of the invention to provide an improved optoelectronic sensor, in particular an adaptive optoelectronic sensor, as well as an improved method of the initially named kind. In this respect, in particular the robustness and security against interference should be improved with respect to a plurality of different interference sources.

This object is satisfied in accordance with the invention with respect to the optoelectronic sensor in that the light signals transmitted by the light transmitter are in each case spread on the basis of a frequency spreading technique (spread spectrum) and are produced using an output signal to which an offset has been applied for the generation of a unipolar signal and in that means for interference suppression are provided to automatically measure respective then current interference repeatedly or continuously, to analyze it in the time domain and/or frequency domain and to compensate it at least substantially in dependence on the respective result of the interference analyses.

The robustness and security against interference of the optoelectronic sensor is considerably improved with respect to a plurality of different interference sources on the basis of this design. It is thus now no longer possible to transmit bipolar spread sequences, that is spread sequences having the values "−1" and "+1", to the unipolar optical medium whose optical power is always positive. With such bipolar spread sequences, the favorable correlation properties of spread sequences can be transmitted to the optical sensor to suppress interference and/or e.g. to allow a distinguishing of signals of different sensors (user separation). A type off cognitive sensor is also provided which ensures adaptive interference suppression.

In this respect, the light transmitter preferably includes means for the scaling of a respective output signal spread in accordance with a frequency spreading technique and provided with an offset applied to it. It can in particular be achieved by such a scaling that the respective light signal transmitted into the monitored zone corresponds to the mean optical transmission power of the respective light-emitting diode of the light transmitter.

The spread sequence can in particular include a pseudo-random code.

In accordance with an advantageous practical embodiment of the optoelectronic sensor in accordance with the invention, the light signals transmitted by the light transmitter are each generated on the basis of an output signal multiplied by a bipolar spread sequence in accordance with the DSSS (direct sequence spread spectrum) frequency spreading technique.

The use of bipolar frequency spreading techniques such as the bipolar DSSS frequency spreading technique with coherent detection is thus also possible, for example, with an IM/DD system. A bipolar spread sequence can thus, for example, be converted into a unipolar sequence by addition of a DC current signal. After the power scaling, the resulting wave form can then be transmitted as an optical power (IM). The received signal can be detected directly (DD) by the photodiode of the light receiver on the receiver side and can then, for example, be high-frequency filtered (AC coupling). An AC coupling is, however, not absolutely necessary. The optionally high-pass filtered signal can in particular be supplied to a correlator whose output signal can then be compared with a presettable limit value. The respective sequence can then be detected in dependence on the limit value.

Such a frequency domain shaping (FDS) is based on the assumption that spread spectrum signals are relatively flat and wide in the frequency domain in comparison with narrow-band interference, i.e. narrow band interference in the frequency domain can easily be detected by a threshold. The adaptivity with respect to interference can in particular be obtained by the shaping of robust spread sequences which are adapted to the properties of the interference signal, i.e. in that the signal energy is positioned in interference-free regions of the spectrum. Frequency domains with pronounced narrow-band interference are thus avoided with the transmitted wave form.

The light receiver expediently includes means to despread the received signal after its high-pass filtering. In this respect, the despreading can in particular take place by multiplication by the respective spread sequence.

In accordance with a preferred practical embodiment of the optoelectronic sensor in accordance with the invention, the means for adaptive interference suppression are designed so that interference occurring in the monitored zone is measured repeatedly, preferably periodically, the power spectrum of the measured interference is determined for the analysis of the interference in the frequency domain and the light signal or the spread sequence are generated so that the amplitude response of the generated light signal in the frequency domain produces a power spectrum complementary to the power spectrum of the detected interference in that the spectral regions covered by the power spectrum of the detected interference are left out.

In this respect, the means for adaptive interference suppression can in particular be designed such that only those signal amplitudes are taken into account for the analysis of the interference in the frequency domain which exceed a presettable limit value.

A light signal is preferably generated so that a phase response of the light signal is produced in the frequency domain which is defined by the spread sequence.

In this respect, the light signal is advantageously produced so that a pseudorandom phase response of the light signal is produced in the frequency domain which includes the amplitude response having the power spectrum complementary to the power spectrum of the detected interference, on the one hand, and the phase response defined by the spread sequence, on the other hand.

To discover the form of the interference, the cognitive optoelectronic sensor in accordance with the invention can, for example, make use of advance information on the environment in the present case which can e.g. be gained by measurements taking place in advance. For this purpose, for example, means can be provided for a repeated or periodical channels sampling in which the interference environment is measured and analyzed.

First, the measured data of the environment can be transformed, for example, by a fast Fourier transform (FFT) algorithm into the frequency domain to estimate the power spectrum of the interference. The most significant frequency peaks of the narrow band interference signals can then be detected by a comparison with a threshold, for example. An amplitude response with a complementary power spectrum can be generated on the basis of this analysis, i.e. an amplitude response in which the signal energy is only positioned in interference-free regions of the spectrum. This amplitude response is then orthogonal to or independent of the amplitude response of the interference since the power spectra do not overlap. A specific phase response, which is in particular defined by a pseudorandom sequence can then be associated with the complementary amplitude response. The signal can in particular be multiplied by a complex phase expression $e^{j\pi \vec{s}}$ wherein $\vec{s}$ can, for example, in the simplest case designate a binary pseudorandom sequence such as an m sequence or a gold code. Generally, however, sequences of a higher order can also be used for the splitting or encoding of the phase. The resulting frequency response can then be back transformed into the time domain by an inverse fast Fourier transform (IFFT), for example, whereby a noise-like sequence is generated which is uncorrelated with the actual interference.

Since the knowledge of the channel for the transmitter is decisive for an adaptive wave forming with such an FDS (frequency domain shaping), such an embodiment is in particular suitable for such optoelectronic sensors in which the transmitter and the receiver are not separate and a back channel is present between the receiver and the transmitter, e.g. when the transmitter and the receiver are accommodated together in a housing.

In accordance with a further advantageous embodiment of the optoelectronic sensor in accordance with the invention, the means for adaptive interference suppression include sampling means for the sampling of the received signal taking place at the chip rate of the spread sequence, means for the transforming of the sampled signal into the frequency domain, an envelope detector serving for the analysis of the interference in the frequency domain and for the detection of signal amplitudes exceeding a presettable limit value and filter means to at least attenuate the amplitudes exceeding the limit value in the frequency domain.

In this respect, means are expediently provided to back transform the signals filtered by the filter means into the time domain. The despreading of the received signal expediently takes place after the back transformation into the time domain.

A frequency domain equalization (FDE) can therefore in particular also be provided at the receiver side for the interference suppression of narrow-band interference. In this respect, such a receiver-side frequency domain equalization (FDE) serving for interference suppression expediently takes place before the despreading.

The received signal can be sampled at the chip rate and can subsequently be transformed into the frequency domain, for example, by an FFT algorithm. Starting in turn from the assumption that narrow band interference in the frequency domain can be easily distinguished from frequency spreading signals, as in particular DSSS signals are broad and flat in comparison with narrow band interference which is narrow in the frequency domain and has a high amplitude, the interference signal is then detected, for example, by a means of an envelope detector in that values are, for example, detected which exceed a specific limit value. The received signal can be damped by an interference suppression filter at those sites at which the interference amplitude in the frequency domain exceeds a specific limit value. In this respect, the suppression filter can, for example, work as a type of whitener in that the signal is limited to a specific value or it can work as a notch filter in that the signal energy is eliminated at the respective frequency sites. The signal can afterward be back transformed into the time domain, for example, by an IFFT algorithm, whereupon the correlation and the detection can take place. Although the signal can still be subject to slight interference, the bit error rate is clearly reduced since the effects of the interference are attenuated.

In contrast to the frequency domain shaping (FDS), the frequency domain equalization (FDE) only takes place in the region of the receiver, with advance information on the interference properties not being necessary in this case. The corresponding interference suppression is based only on the analysis of the received signal and can therefore in particular be used advantageously where the light transmitter is separate from the light receiver.

Pulsed interference represents a known problem in connection with the use of frequency spreading technique. Pulsed interference can in particular be caused by another user which works with a small mark space ratio without power control.

Depending on the then current bandwidth of the interference signal, a number of chips following on from one another can be impaired during the transmission. Accordingly, such impaired chips at the receiver can cause a damaged correlation output signal, which can have the consequence of a false detection.

The means for the adaptive interference suppression in accordance with a further preferred embodiment of the optoelectronic sensor can in particular include a so-called clipping filter for the avoidance of such problems.

In this respect, such a chipping filter is preferably designed to set the received signal in the time domain to a presettable positive or negative value on the exceeding or falling below of a presettable reference value; on the exceeding or falling below a respective presettable positive or negative limit value, to limit the received signal to this value; or to set the received value to zero in each case on an exceeding or falling below of a respective presettable positive or negative limit value.

This embodiment, which is in particular suitable for the suppression of pulsed interference, is based on the assumption that pulsed interference in the time domain is relatively short in comparison with time-expanded frequency spreading signals. Incoming signals in the time domain can be clipped by the clipping filter prior to the correlation and detection if they exceed a specific or presettable limit value. In this respect, three types of response curves are in particular conceivable: hard, soft and punch. Clipping filters with a hard response curve simply effect a hard decision, with the incoming signal being set, for example, to a positive or to a negative value. Clipping filters with a soft response curve are linear in a specific dynamic range and thus do not deliver any hard decision with respect to the signal. On the exceeding or falling below of a respective presettable positive or negative limit value, the signal is, however, limited to this limit value. A punch response curve is comparable with the soft response curve to the extent that the signal does not exceed a presettable limit value. If the limit value is, however, exceeded, the signal is set to the value zero. In that damaged or impaired parts of the signal are set to the value zero, these parts are neutral in the correlation process so that only the correct signal parts are taken into account, whereby the probability of a false detection is reduced to a minimum.

A cognitive optoelectronic sensor is thus provided in which frequency spreading technique such as in particular the DSSS (direct sequence spread spectrum) frequency spreading technique are used and an adaptive interference suppression is achieved by a time interference analysis and/or frequency interference analysis with adaptive intelligent frequency spreading wave forming and/or with an interference suppression filter which is in particular again adaptive. In this respect, the frequency spreading technique used, in particular the DSSS technique, is also simultaneously used in a special manner for adaptive interference suppression which can be implemented in the light transistor and/or in the light receiver. The power capacity of the sensor is considerably increased by the corresponding adaptive transmitter or receiver system.

A respective spread sequence in particular includes a binary pseudorandom sequence.

The light transmitter and the light receiver can be arranged on mutually opposite sides of the monitored zone. A suitable synchronization process is provided in this respect. Suitable processes can be found in Spread Spectrum and CDMA: principles and applications, Valery P. Ipatov, Wiley Interscience 2005, ISBN 978-0-470-09180-7. It is generally also possible to arrange the light transmitter and the light receiver on one side of the monitored zone and a retroreflector on the oppositely disposed side of the monitored zone. The second variant corresponds to an autocollimation arrangement.

The light transmitter and the light receiver can also be provided in a light grid arrangement, for example. In this respect, a plurality of light transmitters can in each case also have a common light receiver associated with them and the number of light receivers can accordingly be smaller than the number of the light transmitters.

The cognitive optoelectronic sensor is therefore in particular configured for an adaptive suppression of the effects of interference. In this respect, the knowledge of the shape of the then current interference can also be included which can be gained by an analysis in the time domain and/or in the frequency domain. Since the interference only occurs relatively rarely in the time domain or in the frequency domain, specific types of interference can be easily distinguished from frequency spreading (FS) signals since frequency spreading signals have a high time bandwidth product.

The method in accordance with the invention is accordingly characterized in that the light signals transmitted from the light transmitter are in this case generated on the basis of an output signal spread in accordance with a frequency spreading technique and provided with an offset applied for the generation of a unipolar signal, in that the electric received signals can be high-pass filtered and in that respective then current interference is measured repeatedly or continuously, is analyzed in the time domain and/or frequency domain and is at least substantially compensated in dependence on the respective result of the interference analyses.

Figure 2:
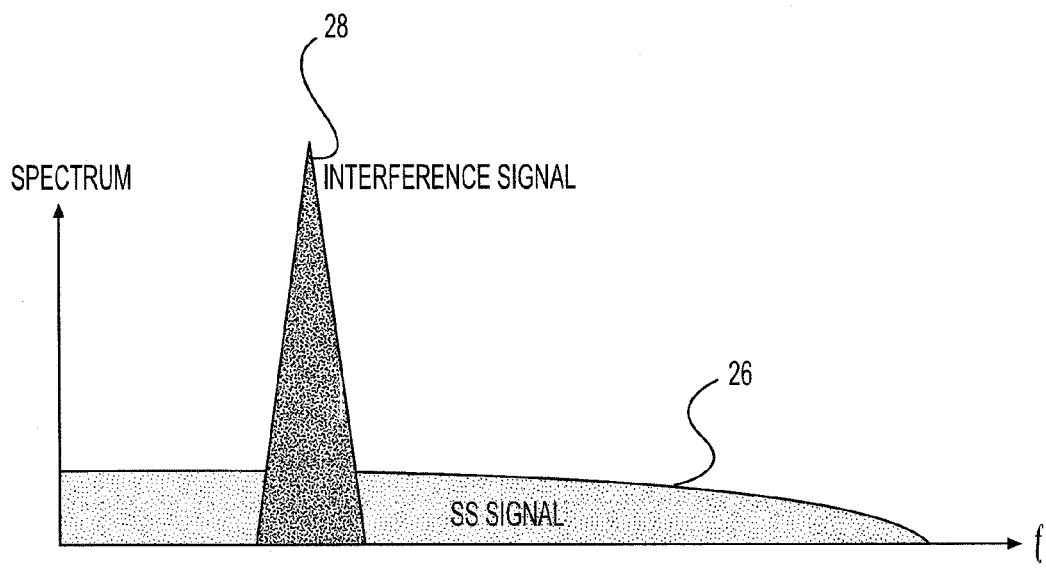
Figure 3:
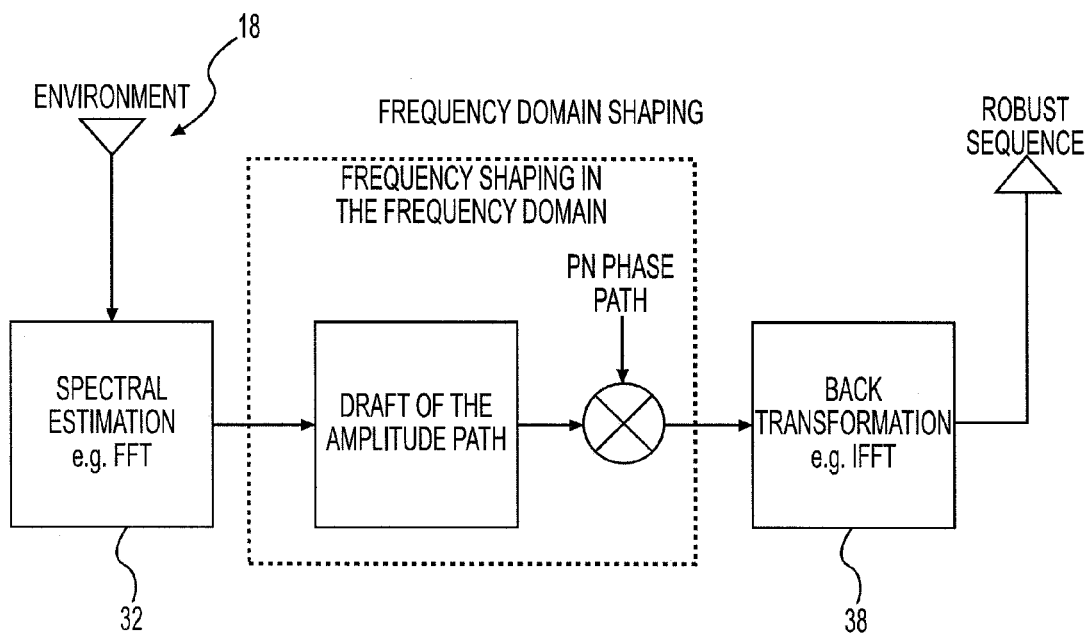
Figure 4:
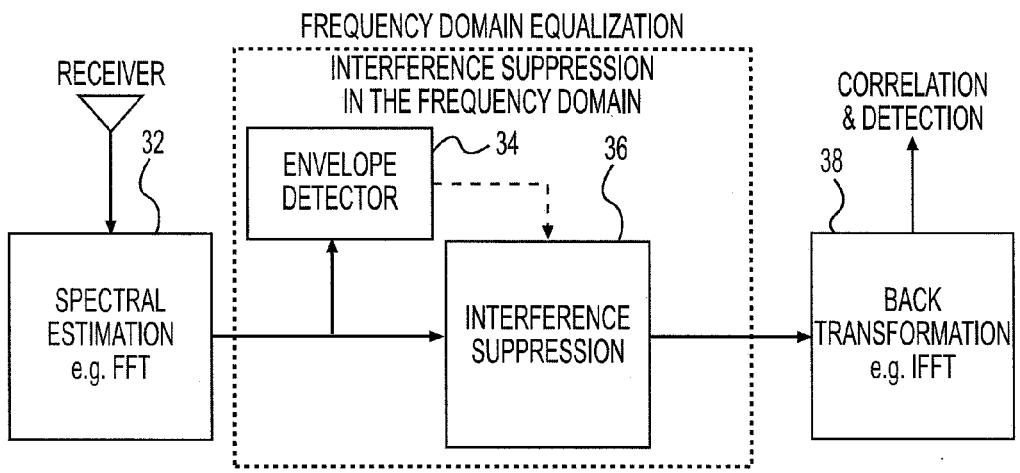
Figure 5:
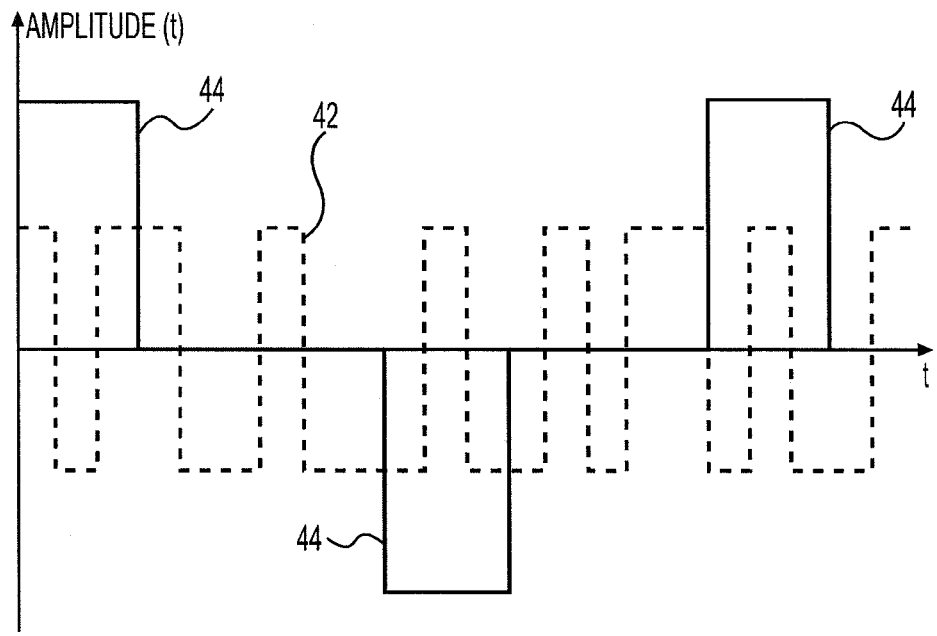
Figure 6:
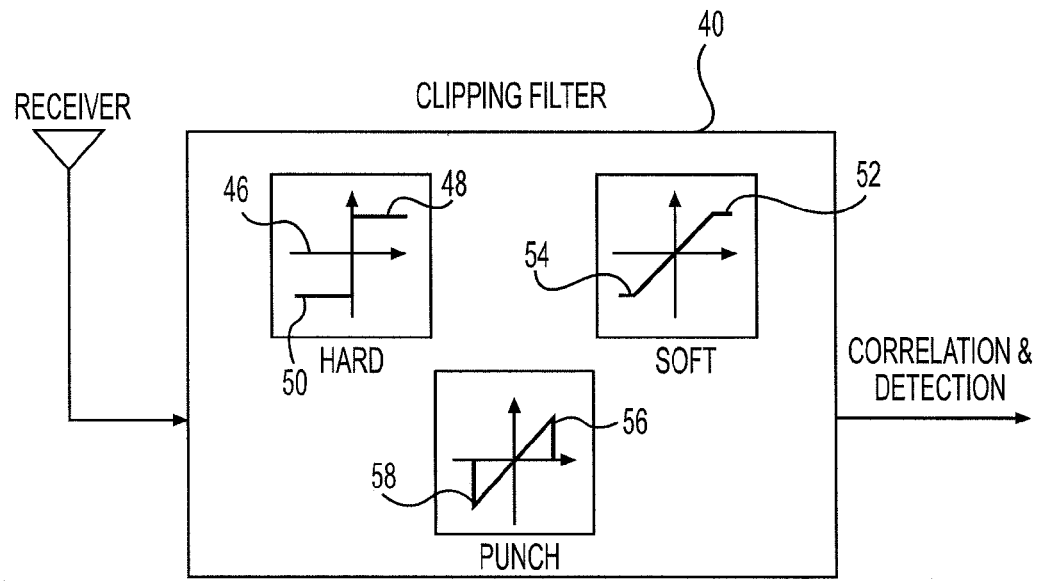

The invention will be explained in more detail in the following with reference to embodiments and to the drawing; there are shown in this:

FIG. 1 a schematic diagram of an exemplary signal modulation;

FIG. 2 exemplary frequency spectra of a DSSS signal and of an interference signal;

FIG. 3 a schematic block diagram of an exemplary FDS (frequency domain shaping) algorithm;

FIG. 4 a schematic block diagram of an exemplary FDE (frequency domain equalization) algorithm;

FIG. 5 an exemplary representation of a frequency spreading signal with an interference signal superimposed on it: and FIG. 6 a schematic representation of an exemplary clipping filter.

FIG. 1 shows a schematic diagram of an exemplary signal modulation.

In particular intensity modulation (IM) can be used together with a direct detection (DD) as a modulation scheme for optoelectronic sensors. In this respect, the transmitted wave form is modulated onto an instantaneous optical power which is radiated by a light-emitting diode (LED) or laser diode of the light transmitter. On the receiver side, the optical power is in particular received by a photodiode (receiver) and is converted directly into an equivalent electric current.

An optoelectronic wireless IM/DD connection can normally only work in an incoherent manner since the transmitted signal is always not negative. In order nevertheless to be able to use bipolar frequency spreading techniques and in particular a bipolar DSSS technique, a more complex embodiment of the transmitter and of the receiver is necessary. For this purpose, FIG. 1 shows an exemplary signal modulation.

An output signal 60 is then first in particular multiplied by a bipolar spread sequence $c(t)$. The bipolar spread sequence $c(t)$ is thereupon transformed into a unipolar sequence by addition of a DC current signal (DC) or of an offset. After an expediently provided power scaling, the resulting wave form $s(t)$ is transmitted as an optical power (IM).

At the receiver, the received light signal $r(t)=s(t)+i(t)+n(t)$ is detected by a photodiode (DD) and then optionally high-pass filtered (AC coupling), where $i(t)$ is the then current interference signal and $n(t)$ (AWGN signal) represents the signal corresponding to the additive white Gaussian noise. The high-frequency filtered signal $r'(t)$ is then supplied to a correlator 10 whose output signal is compared with a presettable limit value. In dependence on the limit value, the respective sequence is then detected in a detector 12.

The respective optoelectronic sensor 14 therefore includes at least one light transmitter 16 for the transmission of light signals $s(t)$ into a monitored zone 18 and at least one light receiver 20 for the reception of transmitted light signals, with the received light signals including the then current interference signal $i(t)$ and the signal $n(t)$ corresponding to an additive white Gaussian noise in particular being converted into electrical received signals by a photodiode of the light receiver 20.

In this respect, the light signals $s(t)$ transmitted by the light transmitter 16 are in each case generated on the basis of an output signal 60 spread in accordance with a frequency spreading technique and provided with an offset 22 applied for the generation of a unipolar signal. The electrical received signals can be filtered by means of a high-pass filter 24. Subsequently to this, the correlation and detection take place by means of the correlator 12 and the detector 12.

The light transmitter 16 can, as already mentioned, include means for the scaling of the respective output signal 60 spread in accordance with a frequency spreading technique and having the offset 22 applied.

In this respect, the light signals $s(t)$ transmitted by the light transmitter 16 can in particular be generated on the basis of an output signal 60 in accordance with the DSSS (direct sequence spread spectrum) frequency spreading technique multiplied by a bipolar spread sequence $c(t)$.

The light receiver 20 can in particular include means to despread the received signal after its high-pass filtering. In this respect, the despreading can in particular take place by multiplication by the respective spread sequence $c(t)$.

The optoelectronic sensor 14 additionally includes means for adaptive interference suppression to automatically measure respective then current interference repeatedly or continuously, to analyze it in the time domain and/or frequency domain and to compensate it at least substantially in dependence on the respective result of the interference analysis. In this respect, as already initially mentioned, the adaptive interference suppression can in particular be based on the following algorithms:

frequency domain shaping (FDS, cf. FIGS. 2 and 3);
frequency domain equalization (FDE, cf. FIG. 4);
clipping filter (CF, cf. FIGS. 5 and 6).

As results from FIGS. 2 and 3, the means for adaptive interference suppression can in particular be designed so that interference occurring in the monitored zone 18 is measured repeatedly, preferably periodically, the power spectrum of the measured interference is determined for the analysis of the interference in the frequency domain and the light signal $s(t)$ or the spread sequence $c(t)$ are generated so that the amplitude response of the generated light signal $s(t)$ in the frequency domain produces a power spectrum complementary to the power spectrum of the detected interference in that the spectral regions covered by the power spectrum of the detected interference are left out. In this respect, the means for adaptive interference suppression can in particular be designed so that only those signal amplitudes are taken into account for the analysis of the interference in the frequency domain which exceed a presettable limit value. The light signal can in particular be generated so that a phase response of the light signal results in the frequency domain which is defined by the spread sequence $c(t)$. In this respect, the light signal $s(t)$ is in particular produced so that a pseudorandom phase response of the light signal is produced in the frequency domain which includes the amplitude response having the power spectrum complementary to the power spectrum of the detected interference, on the one hand, and the phase response defined by the spread sequence, on the other hand.

The FDS (frequency domain shaping) considered here is based on the assumption that frequency spreading signals in the frequency domain are flatter and broader in comparison with narrow band interference, i.e. narrow-band interference in the frequency domain can be easily detected via the comparison with a limit value, as can be seen from FIG. 2 in which exemplary frequency spectra of a DSSS signal 26 and of an interference signal 28 are shown.

The adaptivity with respect to interference is obtained by shaping of robust spread sequences $c(t)$ which are matched to the properties of the interference signal, i.e. the signal energy is positioned in interference-free regions of the spectrum. Frequency domains with strong narrow-band interference are adaptively avoided with the transmission of a corresponding wave form.

The spectra of the DSSS signal 26 and of the interference signal 28 are reproduced in FIG. 2.

To obtain knowledge of the shape of the interference, the cognitive optoelectronic sensor 14 (cf. also FIG. 1) in the present case requires advance information on the environment, such as on the monitored zone 18, which can be obtained by advance measurements. Consequently, the FDS (frequency domain shaping) sensor, for example, includes means for a periodic estimate of the channel properties, with the environment exposed to interference being measured and analyzed during the respective periods.

FIG. 3 shows a schematic block diagram of an exemplary FDS (frequency domain shaping) algorithm. As results from FIG. 3, the measured data of the environment, here e.g. of the monitored zone 18, are first transformed into the frequency domain, for example, by means of an FFT algorithm 32 to estimate the power spectrum of the interference. The significant frequency peaks of the narrow-band interference signals are then detected by comparison with a limit value or threshold value. Based on this analysis, an amplitude response is generated with a complementary power spectrum, i.e. the signal energy is positioned in the interference-free regions of the spectrum. This amplitude response is then orthogonal to or independent of the amplitude response of the interference since the power spectra do not overlap. A particular phase response which can be determined by a pseudorandom sequence, for example, can then be associated with the complementary amplitude response. For this purpose, the signal is preferably multiplied by a complex pseudorandom phase expression $e^{j\pi\vec{\delta}}$ where $\vec{\delta}$ can include in the simplest case a binary pseudorandom sequence such as an n sequence, a gold code, etc. Generally, sequences of a higher order can also be used for the splitting or encoding of the phase. The resulting frequency response is then back transformed into the time domain by means of an IFFT algorithm 38, for example, whereby a noise-type sequence is generated which is uncorrelated with the then current interference.

Since knowledge on the channel is present in the light transmitter 16 in the present case (cf. also FIG. 1 again), which is important for the adaptive FDS wave forming, such an embodiment is particularly suitable when the light transmitter 16 and the light receiver 20 are arranged on the same side of the monitored zone 18 or close to one another. A back channel from the receiver to the transmitter is required. This is e.g. present particularly simply when the transmitter and receiver work on a circuit board in the same housing such as in reflection light barriers.

The means for adaptive interference suppression can in particular also include sampling means for the sampling of the received signal taking place at the chip rate of the spread sequence c(t); means 32 for the spectral estimation, for example transformation, of the sampled signal in the frequency domain; an envelope detector 34 serving for the analysis of the interference in the frequency domain and for the detection of signal amplitudes exceeding a presettable limit value in order at least to attenuate the amplitudes exceeding the limit value (cf. FIG. 4).

In addition, means 38 including an IFFT algorithm can e.g. be provided to back transform the signal filtered by the filtering means 36 into the time domain.

The despreading of the received signal can take place after the back transformation into the time domain.

FIG. 4 shows a schematic block diagram of a corresponding exemplary FDE (frequency domain equalization) algorithm.

As already mentioned, the received signal is then sampled at the chip rate and is transformed into the frequency domain by the transformation means 32 or by an FFT algorithm. Again based on the assumption that narrow-band interference in the frequency domain can be easily distinguished from—frequency spreading (SS) signals, the interference signal is then detected by means of the envelope detector 34, with values exceeding a specific or presettable limit value being detected. The received signal is at least damped by an interference suppression filter 36 at the frequency sites at which the amplitude of the interference signal exceeds a specific or presettable limit value. In this respect, the filter 36 provided for interference suppression can either work in the sense of a whitener in that the signal is limited to a certain value or it can be provided as a notch filter to eliminate the signal energy at the respective frequency sites.

The signal is then back transformed into the time domain by the back transformation means 38, e.g. by an IFFT algorithm, whereupon the correlation and the detection process take place.

Although the signal can be subject to a slight distortion, the bit error rate is considerably reduced since interference influences are at least attenuated.

Unlike the frequency domain shaping (FDS), the frequency domain equalization (FDE) only takes place at the light receiver 20, with no advance information on the interference properties being necessary in the present case. The interference suppression is here based only on the analysis of the received signal and can therefore in particular advantageously be used in such optoelectronic sensors in which the light receiver 20 is separate from the light transmitter 16.

As in particular results from FIGS. 5 and 6, the mean for adaptive interference suppression can in particular also include a clipping filter 40.

In this respect, such a clipping filter can in particular be designed to set the received signal to a presettable positive or negative value in the time domain on the exceeding or falling below of a presettable reference value (hard response curve); on the exceeding or falling below of a respective presettable positive or negative limit value, to limit the received signal to this limit value (soft response curve); or to set the received signal in each case to zero on the exceeding or falling below of a respective presettable positive or negative limit value (punch response curve). The despreading of the received signal can take place after such a clipping filtering.

FIG. 5 shows an exemplary representation of a frequency spreading (SS) signal 42 with an interference signal 44 superimposed thereon.

Pulsed interference represents a known problem in the field of the SS technique. Such pulsed interference can be caused by another user which works with a small mark space ratio without power control.

Depending on the then current band width of the interference signal, a specific number of chips following on from one another can be impaired during the transmission. These impaired chips can consequently cause a damaged correlation output signal at or in the receiver, which can have the consequence of a false detection.

Such pulsed interference can be suppressed on the receiver side by a clipping filter 40, for example, such as is shown by way of example in FIG. 6. The respective means, i.e. in particular the means including such a clipping filter 40, for adaptive filter suppression differ from algorithms for the elimination of narrow-band interference in that, for example, they are based on the assumption that pulsed interference in the time domain are relatively short in comparison with frequency spreading signals, as is indicated in FIG. 5, for example.

FIG. 6 shows an exemplary clipping filter 40 in a schematic representation, with three different variants being shown, for example.

The incoming signal in the time domain can e.g. be clipped by means of such a clipping filter 40 before the correlation and detection, when a specific or presettable limit value is exceeded. In this respect, the three following types of response curves are possible, for example: hard, soft and punch.

In this respect, clipping filters with a hard response curve simply effect a hard decision. On the exceeding or falling below of a presettable reference value, the received signal is set to a presettable positive value 48 or negative value 50.

In contrast, clipping filters with a soft response curve are linear in a specific dynamic range so that no hard decision is made with respect to the signal. On the exceeding or falling below of a respective presettable positive value 52 or negative limit value 54, the received signal is, however, limited to this limit value 52 or 54 respectively.

With clipping filters with a punch response curve, the received signal is in each case set to zero on the exceeding or falling below of a respective presettable positive value 56 or negative limit value 58. If these limit values are not exceeded or fallen below, the respective original value of the received signal is preferably maintained in a similar manner as with the soft response curve. In that damaged or impaired signal parts are set to zero, a neutral character is associated with these parts in the carrying out of the correlation. Accordingly, only the correct signal parts are taken into account, whereby the probability of a false detection is reduced to a minimum.

The means for the adaptive interference suppression and the different algorithms, filters, etc. can in particular be realized in a corresponding, preferably electronic control and/or evaluation device, with this correspondingly designed control and/or evaluation device being able to be associated in part or at least substantially completely with the light transmitter and/or the light transmitter or being able to be integrated therein.

REFERENCE NUMERAL LIST 10 correlator
12 detector
14 optoelectronic sensor
16 light transmitter
18 monitored zone
20 light receiver
22 offset
24 high-pass filter
26 DSSS signal
28 interference signal
32 transformation algorithm
34 envelope detector
36 interference suppression filter
38 transformation algorithm
40 clipping filter
42 SS signal
44 interference signal
46 reference value
48 positive value
50 negative value
52 positive value
54 negative value
56 positive value
58 negative value
60 output signal
c(t) spread sequence
r(t) received light signals
s(t) light signal

The invention claimed is:

1. An optoelectronic sensor (14) having at least one light transmitter (16) for the transmission of light signals (s(t)) into a monitored zone (18) and having at least one light receiver (20) for the reception of light signals, wherein the received light signals (r(t)) are converted into electrical received signals in the light receiver,
characterized in that
the light signals (s(t)) transmitted by the light transmitter (16) are each generated on the basis of an output signal (60) spread in accordance with a frequency spreading technique (spread spectrum) and provided with an offset (22) applied for the generation of a unipolar signal; and in that means are provided to automatically measure repeatedly or continuously respective then current interference, to analyze it in the time domain and/or frequency domain; and to compensate it at least substantially in dependence on the respective result of the interference analysis.

2. An optoelectronic sensor in accordance with claim 1, characterized in that the light transmitter (16) includes means for the scaling of a respective output signal (60) spread in accordance with a s frequency spreading technique and provided with an offset applied.

3. An optoelectronic sensor in accordance with claim 1, characterized in that the spread sequence includes a pseudo-random sequence; and/or in that the lights signals (s(t)) transmitted by the light transmitter (16) are each generated on the basis of an output signal (60) in accordance with the DSSS (direct sequence spread spectrum) frequency spreading technique multiplied by a bipolar spread sequence (c(t)).

4. An optoelectronic sensor in accordance with claim 1, characterized in that the light receiver (20) includes means to despread the received signal, with the despreading preferably taking place by multiplication by the respective spread sequence (c(t)).

5. An optoelectronic sensor in accordance with claim 1, characterized in that the means for adaptive interference suppression are designed so that interference occurring in the monitored zone (18) is measured repeatedly, preferably periodically; the power spectrum of the measured interference is determined for the analysis of the interference in the frequency domain; and the light signal (s(t)) or the spread sequence are generated so that the amplitude response of the generated light signal (s(t)) in the frequency domain produces a power spectrum complementary to the power spectrum of the detected interference in that the spectral regions covered by the power spectrum of the detected interference are left out.

6. An optoelectronic sensor in accordance with claim 5, characterized in that the means for adaptive interference suppression are designed so that only those signal amplitudes are considered for the analysis of the interference in the frequency domain which exceed a presettable limit value.

7. An optoelectronic sensor in accordance with claim 3, characterized in that the light signal (s(t)) is generated so that a phase response of the light signal (s(t)) is produced in the frequency domain which is defined by the spread sequence.

8. An optoelectronic sensor in accordance with claim 7, characterized in that the light signal (s(t)) is produced so that a pseudorandom phase response of the light signal (s(t)) is produced in the frequency domain which includes the amplitude response having the power spectrum complementary to the power spectrum of the detected interference, on the one hand, and the phase response defined by the spread sequence, on the other hand.

9. An optoelectronic sensor in accordance with claim 1, characterized in that the means for adaptive interference suppression include sampling means for the sampling of the received signal taking place at the chip rate of the spread sequence; means (32) for the transforming of the sampled signal into the frequency domain; an envelope detector (34) serving for the analysis of the interference in the frequency domain and for the detection of signal amplitudes exceeding a presettable limit value; and filter means (36) to at least attenuate the amplitudes exceeding the limit value in the frequency domain.

10. An optoelectronic sensor in accordance with claim 9, characterized in that means (38) are provided to back transform the signal filtered by the filter means (36) into the time domain.

11. An optoelectronic sensor in accordance with claim 10, characterized in that the despreading of the received signal takes place after the back transformation into the time domain.

12. An optoelectronic sensor in accordance with claim 1, characterized in that the means for adaptive interference suppression include a clipping filter (40).

13. An optoelectronic sensor in accordance with claim 12, characterized in that the clipping filter (40) is designed to set the received signal in the time domain to a presettable positive value (48) or negative (50) value on the exceeding or falling below of a presettable reference value (46); on the exceeding or falling below of a respective presettable positive limit value (52) or negative limit value (54), to limit the received signal to this limit value (52 or 54 respectively); or to set the received signal to zero in each case on the exceeding or falling below of a respective presettable positive limit value (56) or negative limit value (58).

14. An optoelectronic sensor in accordance with claim 12, characterized in that the despreading of the received signal takes place after the clipping filtering.

15. A method for interference suppression with an optoelectronic sensor (14) having at least one light transmitter (16) for the transmission of light signals (s(t)) into a monitored zone (18) and having at least one light receiver (20) for the reception of light signals in which the received light signals (r(t)) are converted into electrical received signals in the light receiver, characterized in that the light signals (s(t)) transmitted by the light transmitter (16) are each generated on the basis of an output signal (60) spread in accordance with a frequency spreading technique (spread spectrum) and provided with an offset (22) applied for the generation of a unipolar signal; and in that respective then current interference is measured repeatedly or continuously, is analyzed in the time domain and/or frequency domain; and is compensated at least substantially in dependence on the respective result of the interference analysis.

* * * * *